(12) United States Patent
Fuse et al.

(10) Patent No.: US 11,129,329 B2
(45) Date of Patent: Sep. 28, 2021

(54) LAWN MOWER

(71) Applicant: YAMABIKO CORPORATION, Ohme (JP)

(72) Inventors: Yoichi Fuse, Tokyo (JP); Ryota Yamada, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 260 days.

(21) Appl. No.: 16/416,697

(22) Filed: May 20, 2019

(65) Prior Publication Data

US 2019/0357433 A1 Nov. 28, 2019

(30) Foreign Application Priority Data

May 22, 2018 (JP) .............................. JP2018-097986

(51) Int. Cl.
| | | |
|---|---|---|
| *A01D 34/74* | (2006.01) |
| *A01D 34/73* | (2006.01) |
| *A01D 34/78* | (2006.01) |
| A01D 101/00 | (2006.01) |

(52) U.S. Cl.
CPC .......... *A01D 34/74* (2013.01); *A01D 34/733* (2013.01); *A01D 34/736* (2013.01); *A01D 34/78* (2013.01); *A01D 2101/00* (2013.01); *G05D 2201/0208* (2013.01)

(58) Field of Classification Search
CPC .... A01D 34/74; A01D 34/733; A01D 34/736; G05D 2201/0208
See application file for complete search history.

(56) References Cited

U.S. PATENT DOCUMENTS

| | | | | |
|---|---|---|---|---|
| 3,774,379 A | * | 11/1973 | Mizobata | ............... A01D 34/63 |
| | | | | 56/10.3 |
| 2010/0319203 A1 | * | 12/2010 | Ito | .......................... A01D 75/20 |
| | | | | 30/286 |
| 2017/0367257 A1 | * | 12/2017 | Cmich | ................. A01D 34/008 |
| 2019/0307065 A1 | * | 10/2019 | Hong | .................... A01D 34/82 |
| 2020/0128730 A1 | * | 4/2020 | Nakano | ................. A01D 34/73 |

FOREIGN PATENT DOCUMENTS

| | | | | |
|---|---|---|---|---|
| EP | 1211924 B1 | | 6/2002 | |
| JP | 01211421 A | * | 8/1989 | ............ A01D 34/84 |
| JP | 2001178238 A | * | 7/2001 | |
| JP | 2016-208950 A | | 12/2016 | |
| KR | 2013-0031185 A | | 3/2013 | |
| KR | 2015-0054498 A | | 5/2015 | |

OTHER PUBLICATIONS

Extended European Search Report in Europe Application No. 19175650.1, dated Oct. 28, 2019, 4 pages.

* cited by examiner

*Primary Examiner* — Abigail A Risic
(74) *Attorney, Agent, or Firm* — Crowell & Moring LLP

(57) ABSTRACT

A lawn mower capable of securing desired durability as well as suppressing a weight increase is provided. When prong portions on the periphery of a bottom disk are elastically deformed inward due to an external force applied thereto, the prong portions abut a cutting disk, so that the received external force is transferred to the cutting disk (that is, the external force is partially received by the cutting disk), and the displacement of the prong portions is restricted by the presence of the cutting disk.

8 Claims, 9 Drawing Sheets

LAWN MOWER

RELATED APPLICATIONS

The present application claims priority from Japanese patent application JP 2018-097986 filed on May 22, 2018, the content of which is hereby incorporated by reference into this application.

BACKGROUND OF THE INVENTION

1. Field of the Invention

The present disclosure relates to a lawn mower, in particular, the one adapted to protect objects left on the ground from its mowing blade.

2. Description of the Related Art

In recent years, automatically traveling lawn mowers (also referred to as autonomously traveling or self-traveling lawn mowers) for mowing lawns or weeds on the ground (hereinafter also collectively referred to as grass) without the need of operations by operators have come into widespread use. Such automatically traveling lawn mowers include, for example, electric motors for driving wheels (hereinafter referred to as a traveling motor) and for driving mowing blades (or cutting blades) (hereinafter referred to as an operating motor), a control unit for controlling these motors, and a battery for supplying power to the motors and control unit. Such an automatically traveling lawn mower is capable of mowing grass with its mowing blade rotated substantially horizontally while the lawn mower is automatically traveling with drive wheels within a mowing area (hereinafter also referred to as a field) zoned with a wire or the like. Further, when a predetermined number of operation cycles are finished or the battery level has dropped to a predetermined level or lower during the mowing operation, the lawn mower automatically returns to a charging station to automatically charge the battery at the charging station. Upon completion of charging the battery, the lawn mower automatically resumes the mowing operation within the designated mowing area. Such an automatically traveling lawn mower, known as a so-called robotic lawn mower or robotic mower, is capable of mowing grass for long hours without the presence of operators.

Further, some of such lawn mowers that have been recently developed include a plurality of mowing blades attached to a cutting disk that is driven by an operating motor so as to be rotated substantially horizontally, for such purposes as protection of the mowing blades, improved maintenance performance, and size reduction (see, for example, JP 2016-208950 A).

The aforementioned lawn mowers (robotic mowers) can be used in various places and areas such as golf courses, sports arenas, parks, and private yards, but when the robotic mowers are used to mow fields where golf balls are present (such as golf practice fields), for example, a guard member called a golf ball guard disk is needed to prevent the mowing blades from damaging the golf balls.

Like the one described in EP 1211924 A1, for example, some of already-known robotic mowers with such a guard member include a motor with a drive shaft, a cutting disk perpendicularly coupled to the drive shaft and having at least one mowing blade on the periphery of the cutting disk, a bottom disk disposed substantially parallel to and below the cutting disk, and a plurality of prong portions disposed on the periphery of the bottom disk and extending radially outward beyond an area reachable by the mowing blade.

In the aforementioned lawn mower described in EP 1211924 A1, the bottom disk is attached to the drive shaft of the motor via a roller bearing or the like and is adapted to rotate with the rotation of the motor when the motor rotates. Therefore, when the lawn mower approaches a golf ball on the ground while automatically traveling (during the mowing operation), the prong portions (or the distal ends thereof) of the rotating bottom disk contact and flick the golf ball before the mowing blade contacts it, thereby preventing the mowing blade from damaging the golf ball and protecting the mowing blade as well.

Further, in the lawn mower described in EP 1211924 A1 to adjust the height of the mowing blade relative to the ground or the height of mowing operation to be performed, the cutting and bottom disks are coupled to the body chassis via a suspension system so as to integrally ascend and descend relative to the body chassis, and the prong portions curve slightly upward toward their distal ends. Therefore, even if the prong portions of the bottom disk that are rotating as described above cannot flick the golf ball while the lawn mower is automatically traveling (during the mowing operation), the bottom disk more easily travels over the golf ball. This can also prevent the mowing blade from damaging the golf ball and protect the mowing blade as well.

Furthermore, since the rotating mowing blade can cut the grass that has been caught between the adjacent prong portions during the normal operation, the mowing operation can be performed without collecting golf balls in advance even in the fields where such golf balls are scattered as described above.

SUMMARY OF THE INVENTION

On the fields to be mowed by lawn mowers, obstructions to the mowing operation may be present, such as stones and rocks as well as objects to be protected left on the ground, e.g., golf balls. If the lawn mower described in EP 1211924 A1, which inevitably has a large mass, bumps against hard obstructions on the field, such as stones and rocks, a huge impact is applied to the bottom disk. In such occasions, the bottom disk as a guard member, commonly made of a thin metal plate, with thin, long prong portions provided on its periphery, is easily deformed or damaged.

If the bottom disk, in particular, the prong portions provided on the periphery of the bottom disk are deformed or damaged as described above, the mowing blade of the cutting disk is exposed, thereby possibly damaging itself as well as golf balls on the field.

To address such issues, measures to secure the strength of the bottom disk for improved durability may be considered by thickening the bottom disk or employing a rigid material therefor. However, such measures may lead to a weight increase, causing various problems, such as an increase in the load on the operating motor to which the bottom disk is attached, a reduced operable time, inconvenience in carrying, and a far greater impact applied to the bottom disk.

The present disclosure has been made in view of the foregoing, and provides a lawn mower capable of securing desired durability as well as suppressing the weight increase.

A lawn mower according to the present disclosure basically includes a cutting disk that has at least one mowing blade and is rotatable about a rotating shaft, a bottom disk disposed below the cutting disk, and a plurality of prong portions that are provided on the periphery of the bottom disk and extend radially outward beyond an area reachable by the mowing blade, in which the prong portions are made of an elastically deformable material and curve upward toward distal ends thereof, and are adapted to abut the cutting disk when elastically deformed inward due to an external force applied thereto.

In some embodiments, the area reachable by the mowing blade is set in an inner area relative to the rim of the cutting disk.

In some embodiments, the bottom disk is attached to the rotating shaft at a position below the cutting disk so as to be relatively rotatable about the rotating shaft.

In some embodiments, the distal ends of the prong portions extend radially outward beyond the cutting disk and to a position above the underside of the cutting disk, when the prong portions are not subjected to an external force.

In some embodiments, the roots of the prong portions extend on the same plane as that of the bottom disk from the periphery of the bottom disk and the prong portions curve upward from the roots toward the distal ends thereof.

In some embodiments, the bottom disk is made of resin.

In some embodiments, the cutting disk is supported such that it is movable upward relative to the body chassis of the lawn mower so as to ascend and descend relative to the body chassis of the lawn mower, thereby adjusting the height of mowing operation to be performed by the mowing blade.

In some embodiments, the lawn mower can automatically travel.

According to the present disclosure, when the prong portions on the periphery of the bottom disk are elastically deformed inward due to an external force applied thereto, the prong portions abut the cutting disk so as to transfer the received external force to the cutting disk (in other words, the external force is partially received by the cutting disk), and the displacement of the prong portions is restricted by the presence of the cutting disk. Thus, even when the bottom disk is formed thin and light, the strength thereof can be easily secured. Therefore, the prong portions of the bottom disk are less likely to be deformed or damaged, even when they bump against hard obstructions on the ground within the mowing area. As a result, desired durability can be secured.

DETAILED DESCRIPTION OF THE PREFERRED EMBODIMENTS

An embodiment of the present disclosure will be described below with reference to the drawings.
[Overall configuration of lawn mower 1]

Figure 1:
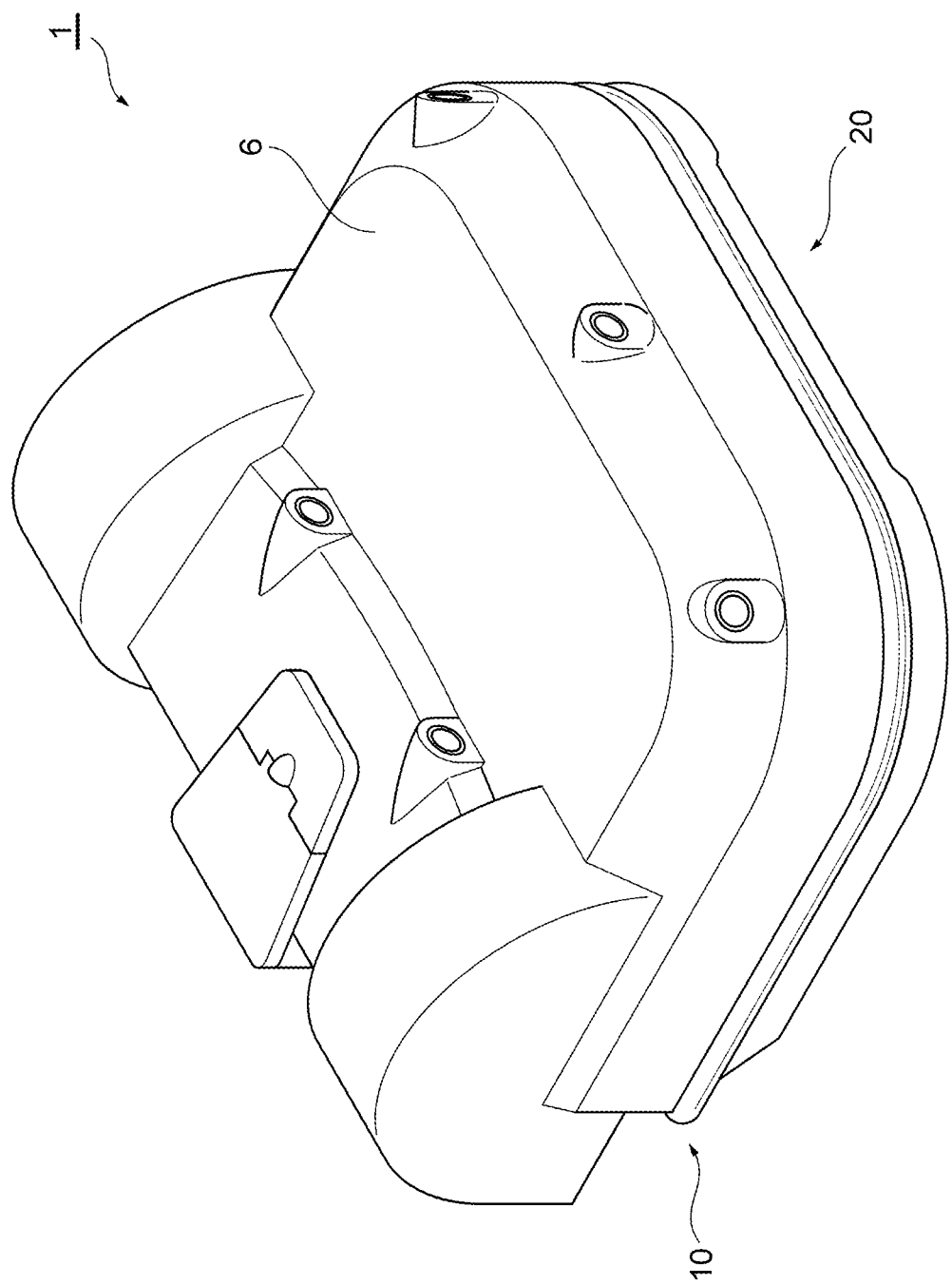
FIG. 1 is an overall perspective view of an embodiment of a lawn mower according to the present disclosure.
Figure 2:
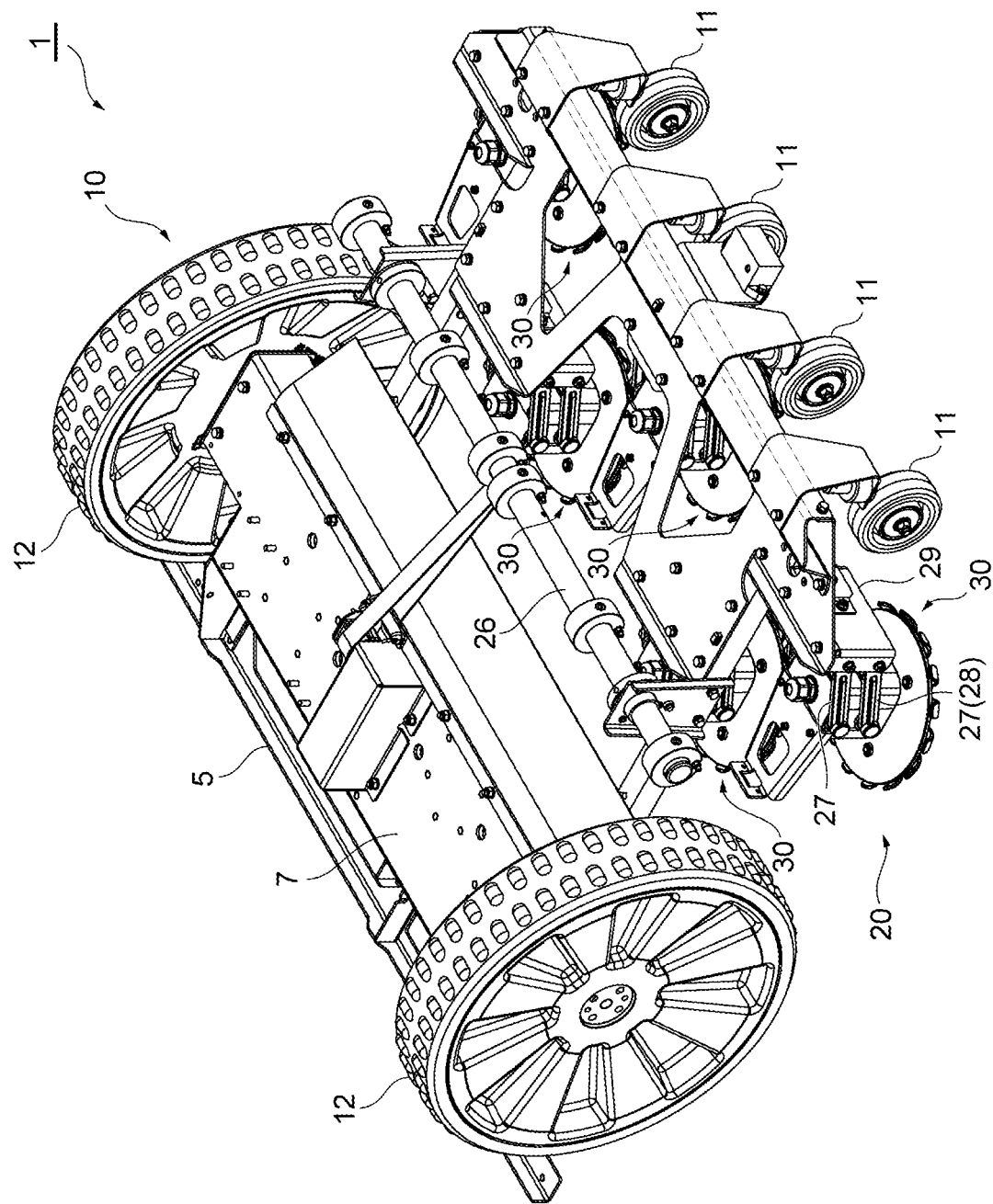
FIG. 2 is an exploded perspective view of the lawn mower illustrated in FIG. 1 when a body housing is removed from the lawn mower.

FIG. 1 is an overall perspective view of an embodiment of a lawn mower according to the present disclosure. FIG. 2 is an exploded perspective view of the lawn mower illustrated in FIG. 1 when a body housing is removed from the lawn mower.

A lawn mower 1 of the embodiment shown in the drawings is an unmanned automatically traveling lawn mower (a so-called robotic lawn mower or robotic mower) that is configured to travel automatically while mowing grass within a predetermined mowing area (field).

The lawn mower 1 mainly includes a traveling unit 10 adapted to drive the wheels for automatic traveling, an operating unit 20 adapted to drive a mowing blade to perform mowing operation, a control unit (not shown) adapted to automatically control the traveling unit 10 (or a traveling motor thereof) and the operating unit 20 (or an operating motor 31 thereof), and a battery (not shown) adapted to supply power to the traveling unit 10 (or the traveling motor thereof), the operating unit 20 (or the operating motor 31 thereof), and the control unit. These are mounted on a body chassis 5 and are covered with a body housing 6 with an open bottom.

Further, although not shown, the lawn mower 1 includes various detection sensors (such as an obstruction detection sensor, angular rate sensor, acceleration sensor, wire detection sensor, and battery level detection sensor). Signals detected by these various detection sensors are transmitted to the control unit so as to be used for automatically controlling the traveling unit 10 and operating unit 20. The wire detection sensor, for example, is adapted to detect wires that mark the area to be mowed for the lawn mower 1 that is automatically traveling, as will be described later.
[Configuration of traveling unit 10]

The lawn mower 1 of the present example is a rear-wheel-drive self-traveling robot. The traveling unit 10 of the lawn mower 1 has a plurality of front wheels 11 (four wheels in the example shown herein) aligned laterally (that is, in the transverse direction) in the front portion of the body chassis 5, and a pair of left and right rear wheels 12 in the rear portion of the body chassis 5.

Each front wheel 11 that is a non-drive wheel (also referred to as a driven wheel) of the present example is an adjustable roller. However, it is obvious that the front wheel 11 is not limited to an adjustable roller, but may be a fixed roller, and that the number of the front wheels 11 is not limited to that of the example shown herein.

Meanwhile, the left and right rear wheels 12, which are drive wheels, are individually driven by traveling motors (not shown) for automatic traveling that are mounted on the respective rear wheels 12, thereby being capable of steering the lawn mower 1.

The control unit includes a microcomputer with a CPU, RAM, ROM, and the like, and is adapted to recognize the boundaries of the mowing area, based on signals detected by the wire detection sensor, and individually control the drive of the traveling motors disposed on the respective rear wheels 12, based on signals detected by the angular rate sensor, acceleration sensor, and the like, thereby enabling the lawn mower 1 to automatically travel forward and backward and turn within the mowing area.

Further, when a predetermined number of operation cycles are finished or the battery level is determined to have dropped to a predetermined level or lower, based on signals detected by the battery level detection sensor, the control unit steers the lawn mower 1 so as to have it return to a charging station for charging the battery at the charging station. After the battery is charged, the mowing operation can be resumed in the designated mowing area.

It should be noted that the automatic traveling method (specifically, the method of recognizing the boundaries of the area for automatic traveling) of the present example adopts a wire recognition method (see also JP 2016-208950 A), but it is obvious that any other known methods may also be used.

In the present example, the control unit, the battery as a power source of the lawn mower 1, and the traveling motors disposed on the respective rear wheels 12 are housed in a covering case 7 disposed between the left and right rear wheels 12, which are the drive wheels.

[Configuration of operating unit 20]

The operating unit 20 of the lawn mower 1 of the present example includes a cutting head 30 mounted between the front wheels 11 and rear wheels 12 of the body chassis 5. Specifically, the operating unit 20 includes a plurality of cutting heads 30 (five cutting heads in the example shown herein) with an identical configuration, arranged in a zigzag manner in the transverse direction so as to cover an area that corresponds to the substantially entire width of the lawn mower 1 in the transverse direction as seen in the longitudinal direction (or the advancing direction) of the lawn mower 1.

It should be noted that the arrangement, the number, the size, and the like of the cutting heads 30 of the operating unit 20 are not limited to those in the example shown herein, but may be appropriately determined depending on, for example, the sizes of the lawn mower 1 and the area to be mowed.

Each cutting head 30 of the present example is coupled to the body chassis 5 via a coupling frame 29 and a pair of upper and lower coupling members 28 attached to the coupling frame 29 in a vertically oscillatable manner. Specifically, the coupling frame 29 is securely coupled to the body chassis 5, and the coupling members 28, each having a pair of bifurcated coupling arms 27 on the left and right sides, are attached to upper and lower portions of the coupling frame 29 in a vertically oscillatable manner. The distal ends of the coupling arms 27 (that is, four coupling arms 27 in total) of the coupling members 28 are coupled to the cutting head 30 (or the motor housing 33 thereof).

Further, each cutting head 30 has a mechanism (or a mowing height adjusting mechanism) for adjusting the height thereof relative to the ground, that is, the height of mowing operation to be performed or the length of the grass to be cut by mowing blades 36 by ascending and descending the cutting head 30 relative to the body chassis 5 using the coupling members 28 and the like (the mowing height adjusting mechanism will be described later).

(Configuration of cutting head 30)

Figure 3:
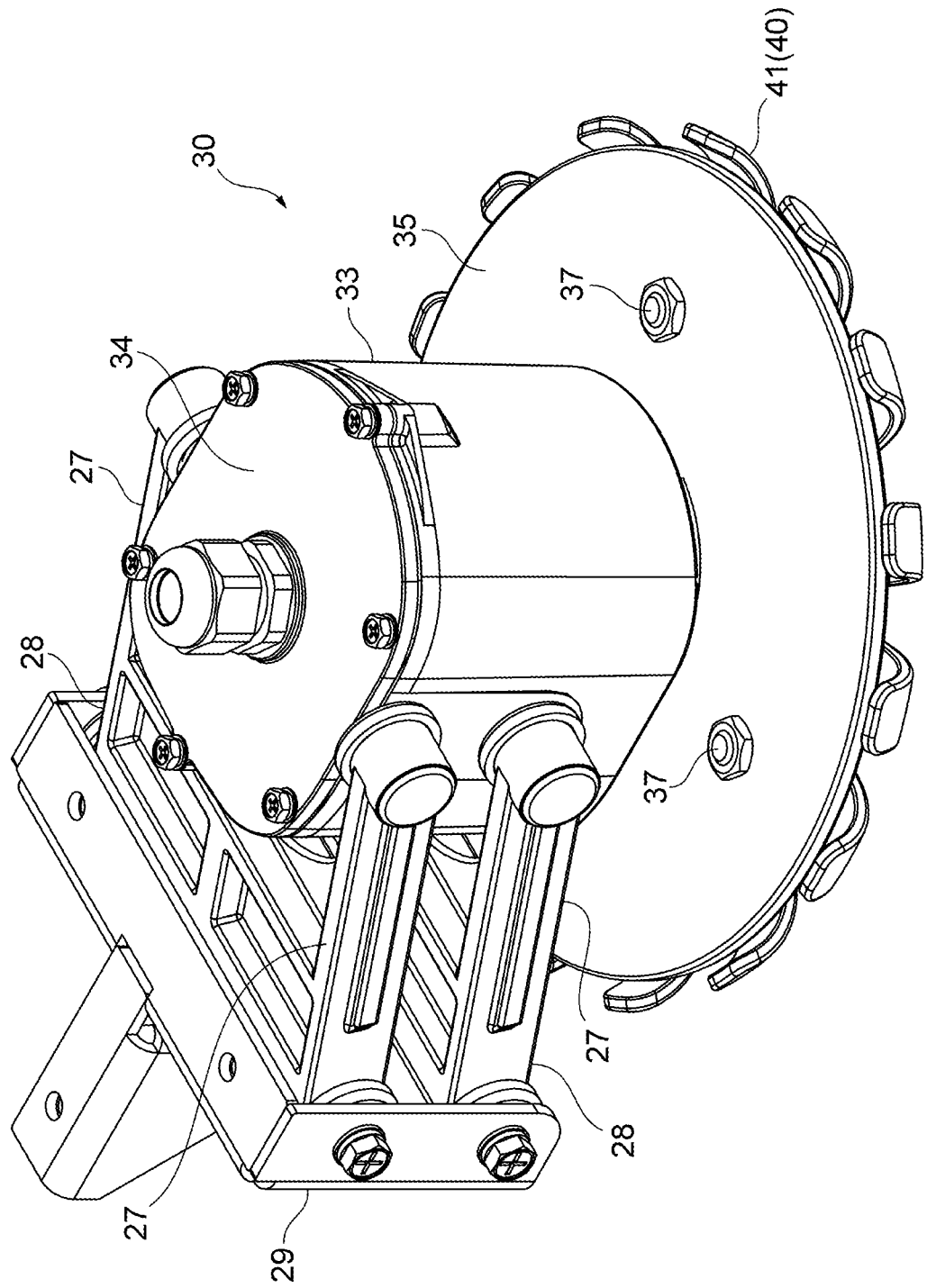
FIG. 3 is an enlarged perspective view of a main portion of a cutting head portion illustrated in FIG. 2.
Figure 4:
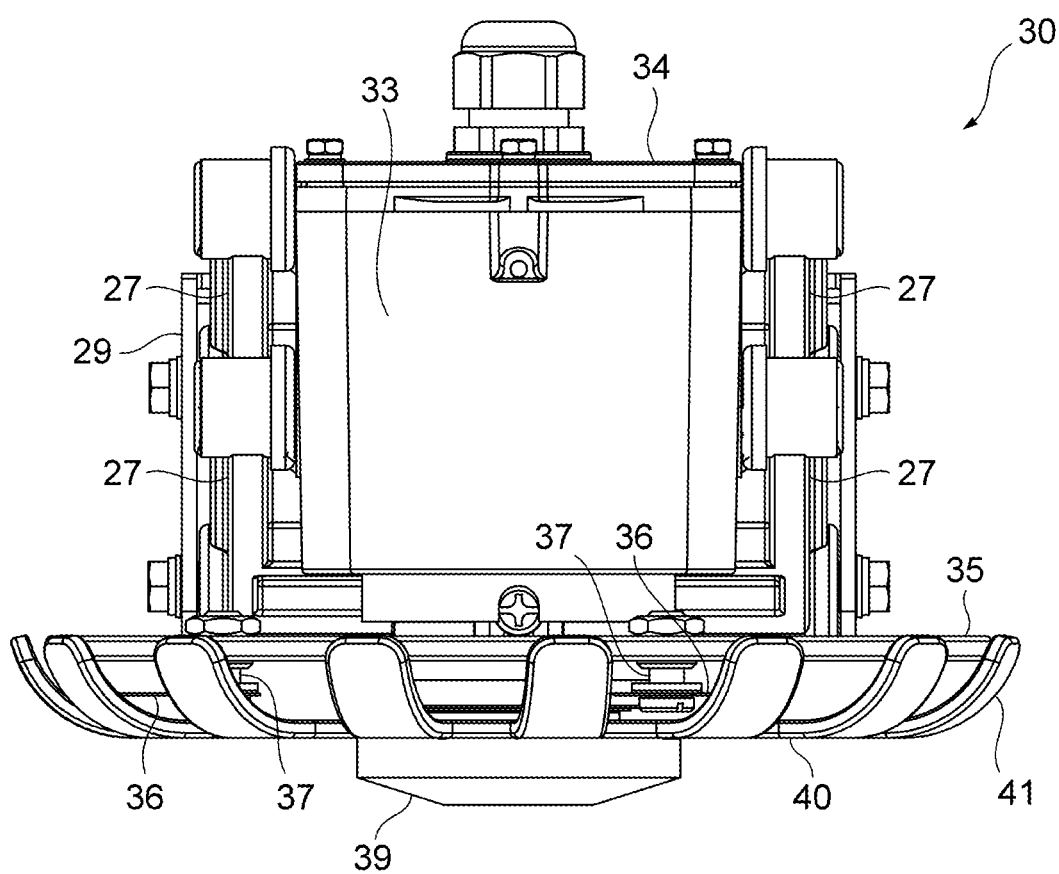
FIG. 4 is a front view of the cutting head of FIG. 3.
Figure 5:
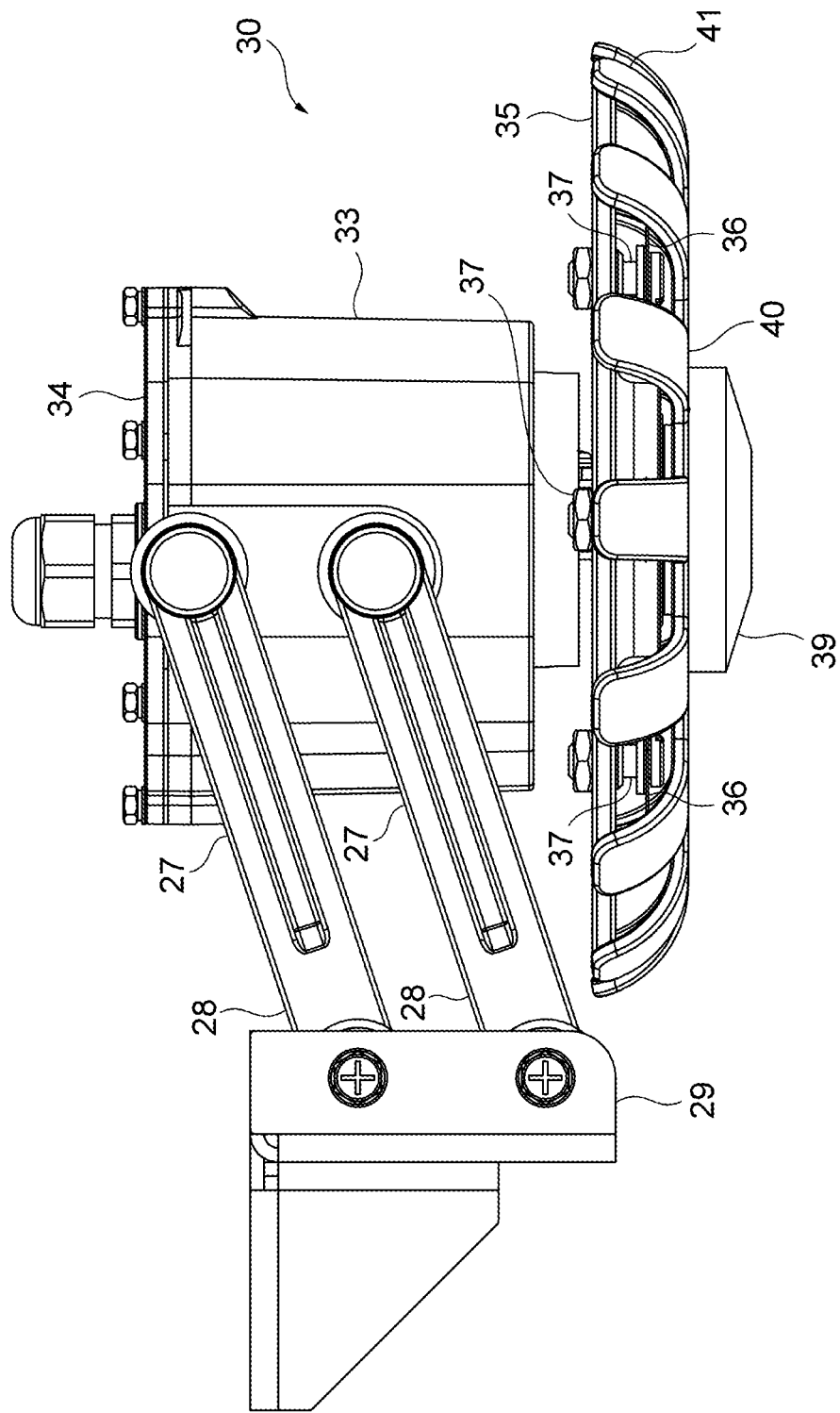
FIG. 5 is a side view of the cutting head of FIG. 3.
Figure 6:
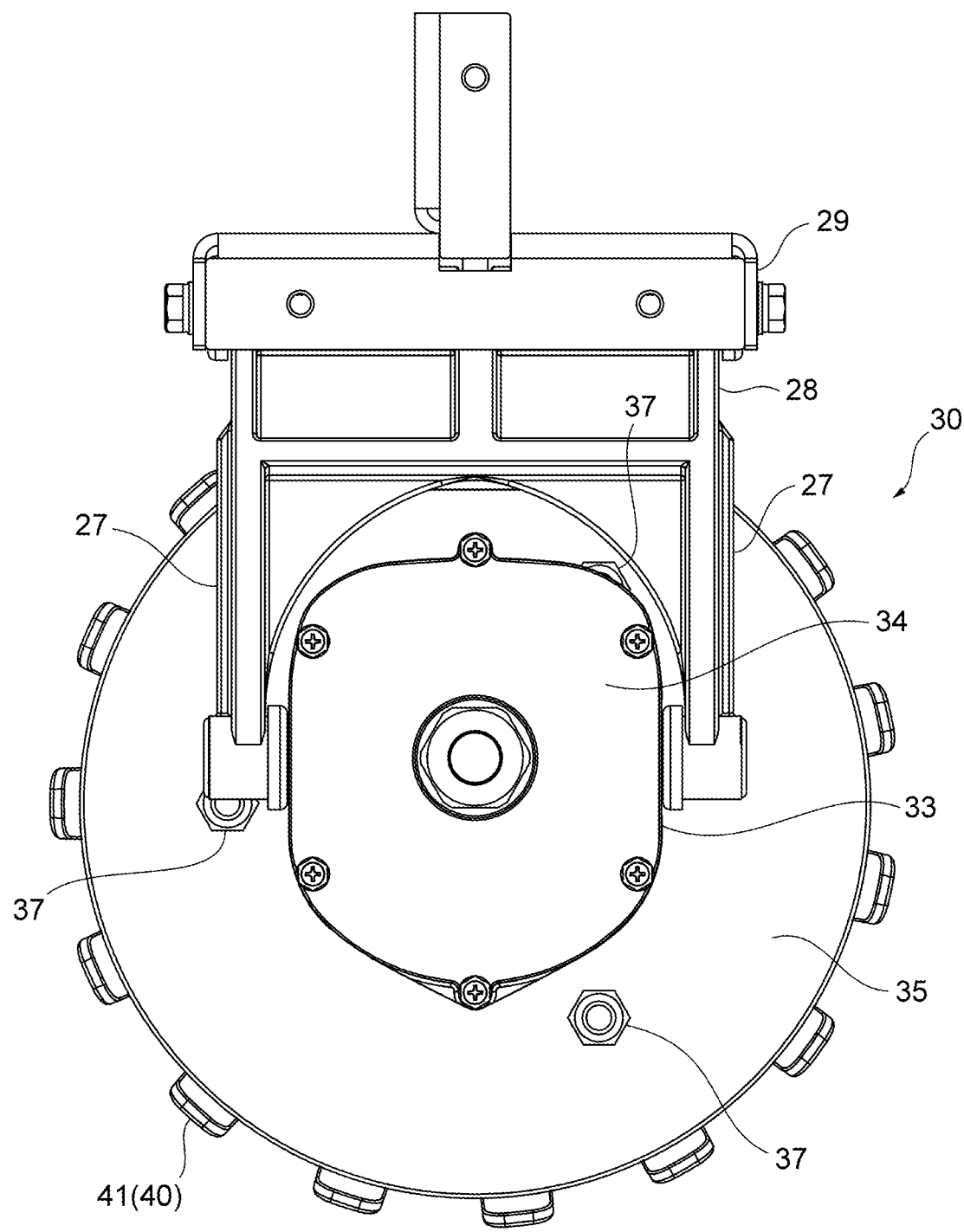
FIG. 6 is a top view of the cutting head of FIG. 3.
Figure 9:
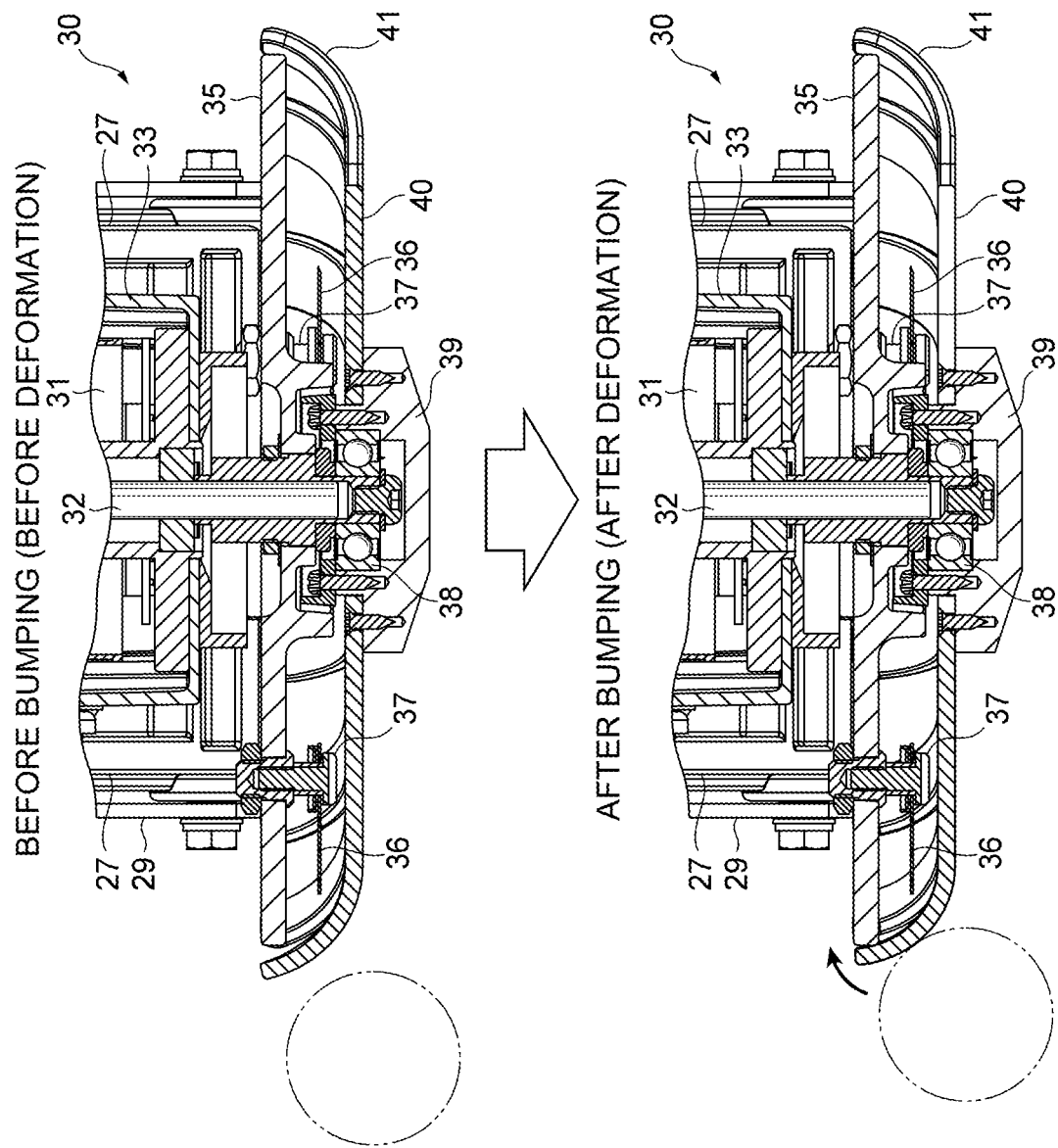
FIG. 9 is an enlarged longitudinal sectional view of the main portion of the cutting head of FIG. 3 before and after bumping against a left object (such as a golf ball).

The configuration of the cutting heads 30 of the operating unit 20 will be detailed with reference to FIG. 3 to FIG. 9. FIG. 3 is an enlarged perspective view of a main portion of the cutting head portion illustrated in FIG. 2. FIG. 4 to FIG. 8 are the front view, side view, top view, bottom view, and longitudinal sectional view of the cutting head of FIG. 3, respectively. FIG. 9 is an enlarged longitudinal sectional view of the main portion of the cutting head of FIG. 3 before and after bumping against a left object (such as a golf ball).

Each cutting head 30 is adapted to project downward from the body chassis 5 and has a cutting disk 35 adapted to rotate on a plane substantially parallel to the ground while the lawn mower 1 is automatically traveling. The cutting disk 35 has the mowing blades 36 rotatably attached to the underside thereof. The cutting disk 35 is rotationally driven by the operating motor 31, which is provided separately from (independently of) the traveling motor. Thus, the mowing blades 36 below the rotating cutting disk 35 are also relatively rotated (specifically, the mowing blades 36 oscillate within the range of minute angles) on a plane substantially parallel to the ground so as to mow the grass on the ground.

More specifically, each cutting head 30 has a cylindrical motor housing 33 with a lid member 34, and the cylindrical motor housing 33 is coupled to and supported by the four coupling arms 27 at its four locations on the upper, lower, left, and right sides. The motor housing 33 houses the operating motor 31 adapted to rotationally drive the cutting disk 35. An output shaft (rotating shaft) 32 of the operating motor 31 extends downward from the motor housing 33 toward the ground, and has the thick, round cutting disk 35 securely coupled to its lower portion (a portion of the output shaft 32 projecting downward from the motor housing 33) such that the think, round cutting disk 35 is rotatable integrally with the output shaft 32 (see, in particular, FIG. 8).

The cutting disk 35 has a plurality of mowing blades 36 (three mowing blades 36 in the example shown herein) with an identical shape mounted on its underside at a substantially equiangular interval in the circumferential direction. The mowing blades 36 are relatively rotatably attached to the cutting disk 35 via bolts 37 such that they rotate on a plane substantially parallel to the cutting disk 35. That is, the center of rotation (axis) of the cutting disk 35 and those of the mowing blades 36 are eccentrically positioned.

Figure 7:
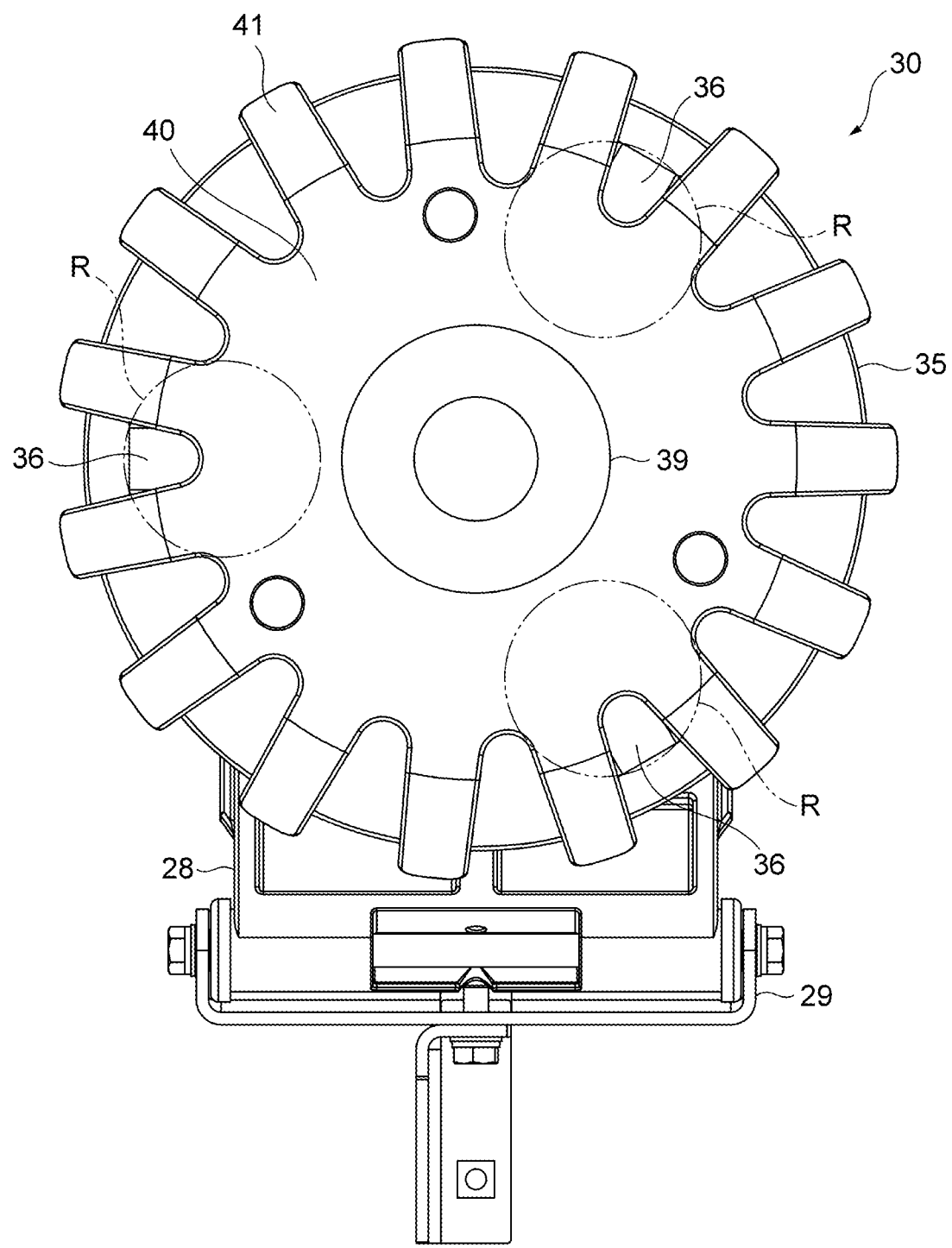
FIG. 7 is a bottom view of the cutting head of FIG. 3.
Figure 8:
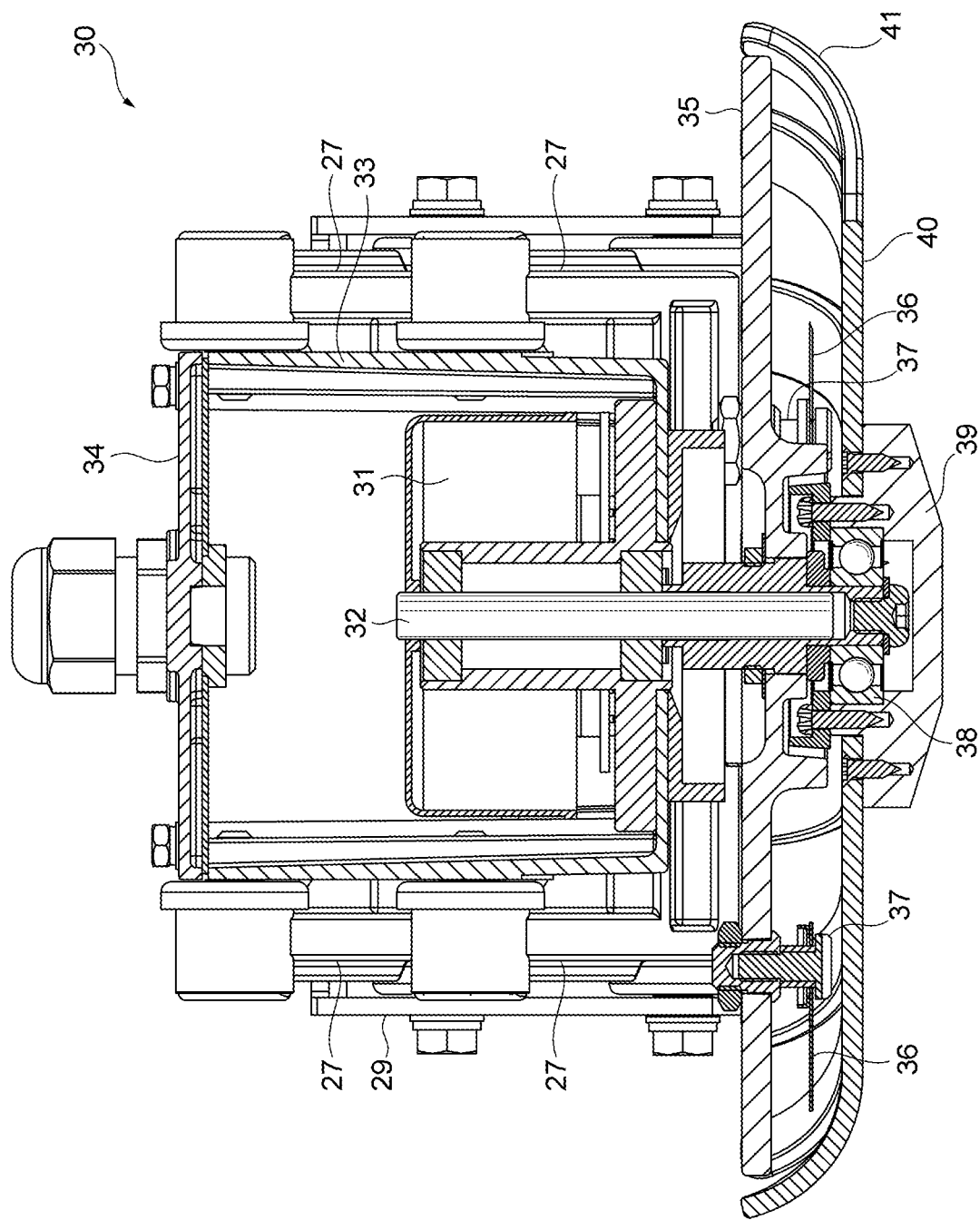
FIG. 8 is a longitudinal sectional view of the cutting head of FIG. 3.

Herein, in the present embodiment, areas R reachable by the mowing blades 36 (that is, the rotation trajectories of the mowing blades 36) are set in inner areas relative to the rim of the round cutting disk 35 (see FIG. 7). Thus, when the prong portions 41 of the bottom disk 40, which will be described later, are elastically deformed inward due to an inward external force applied thereto, contact between the mowing blades 36 and prong portions 41 can be avoided (which will be detailed later).

Further, in the present embodiment, the thin, round bottom disk 40 (also referred to as an anti-friction disk) is attached to the lower end of the output shaft 32 so as to be positioned below the cutting disk 35. Specifically, the bottom disk 40 is made of an elastically deformable resin (for example, PP resin) and has on its inner periphery a lid-like cover member 39 that covers the lower end of the output shaft 32, with a roller bearing 38 interposed between the cover member 39 and the lower end of the output shaft 32 (see, in particular, FIG. 8). The bottom disk 40 is attached to the output shaft 32 with a bearing such as the roller bearing 38 interposed therebetween as described above, so as to be relatively rotatable about the output shaft 32 following the rotation of the output shaft 32 when the output shaft 32 rotates.

Although the bottom disk 40 herein is made of an elastically deformable resin, it may be made of any other elastically deformable materials, such as metal, e.g., spring steel, or rubber.

Furthermore, a plurality of prong portions 41 (15 prong portions 41 in the example shown herein) are provided on the periphery (or the rim) of the bottom disk 40 at a predetermined interval so as to project radially outward. The prong portions 41 are each formed in a substantially rectangular shape with a predetermined width in the circumferential direction, as seen from the bottom, and extend to the outer side of the cutting disk 35 (or the rim thereof) beyond the areas R (that is, the rotation trajectories of the mowing blades 36) reachable by the mowing blades 36 (see FIG. 7). Further, the roots of the prong portions 41 extend on the same plane as that of the bottom disk 40 from the periphery of the bottom disk 40 and the prong portions 41 curve gradually upward from the roots toward their distal ends (or their outer ends), as seen from the side. The distal ends (or the outer ends) of the prong portions 41 extend radially outward beyond the cutting disk 35 (or the rim thereof) and up to positions above the underside of the cutting disk 35.

(Operation of Cutting Head 30)

In the lawn mower 1 including the cutting head 30 with the aforementioned configuration, when the operating motor 31 is driven while the lawn mower 1 is automatically traveling using the traveling unit 10, the cutting disk 35 rotates integrally with and about the output shaft 32. Then, the mowing blades 36 of the cutting disk 35 are raised in the circumferential direction (relative to the cutting disk 35) due to the centrifugal force of the rotation of the cutting disk 35, thereby cutting the grass caught between the adjacent prong portions 41 of the bottom disk 40 in the lower portion of the traveling lawn mower 1. The mowing blades 36 oscillate (in a direction opposite to the direction they are raised due to the centrifugal force) within the range of minute angles due to the reaction force when the grass is cut, but return to the raised state due to the centrifugal force. The mowing blades 36 repeat such oscillation within the range of minute angles.

Further, when the operating motor 31 is driven, the output shaft 32 is rotated and the bottom disk 40 is also rotated with the rotating output shaft 32 (via the roller bearing 38). Therefore, when the lawn mower 1 approaches an object left on the ground (such as a golf ball) while automatically traveling (during the mowing operation), the prong portions 41 of the rotating bottom disk 40 contact and flick the object before the mowing blades 36 contact it.

Furthermore, when the prong portions 41 of the bottom disk 40 contact obstructions on the around (such as hard stones and rocks) or the prong portions 41 of the bottom disk 40 that are rotating as described above cannot flick objects left on the ground (such as golf balls) while the lawn mower 1 is automatically traveling (during the mowing operation), the prong portions 41 of the bottom disk 40 receive an inward external force from the obstructions or objects left on the ground. Herein, in the present embodiment, the bottom disk 40 is made of an elastically deformable material and the prong portions 41 of the bottom disk 40 curve gradually upward toward their distal ends (or their outer ends). Further, the distal ends (or the outer ends) of the prong portions 41 extend radially outward beyond the cutting disk 35 (or the rim thereof) and up to positions above the underside of the cutting disk 35 when the prong portions 41 are not subjected to an external force. Therefore, when the prong portions 41 of the bottom disk 40 are elastically deformed inward due to an external force applied thereto, the distal ends of the prong portions 41 abut the rim of the cutting disk 35. Thus, the received external force is transferred to the cutting disk 35 (in other words, the external force is partially received by the cutting disk 35), and the displacement of the prong portions 41 is restricted by the presence of the cutting disk 35 (see FIG. 9).

It should be noted that as described above, since the areas R reachable by the mowing blades 36 are set in inner areas relative to the rim of the round cutting disk 35, even if the prong portions 41 of the bottom disk 40 are elastically deformed inward due to an external force applied thereto and the distal ends of the prong portions 41 abut the rim of the cutting disk 35, the prong portions 41 do not contact the mowing blades 36 that oscillate on the underside of the cutting disk 35.

(Configuration of Mowing Height Adjusting Mechanism)

Further, the cutting heads 30 of the operating unit 20 each have a mowing height adjusting mechanism for adjusting the height of the mowing blades 36 relative to the ground, that is, the height of mowing operation to be performed, in addition to the aforementioned configuration.

More specifically, in the present example, the body chassis 5 has a winding shaft 26 rotatably disposed thereon along the lateral direction (see FIG. 2). The cutting heads 30 are urged downward by urging springs (not shown) as urging members provided on the coupling arms 27, and are also supported by being suspended by adjusting belts (not shown) wound around the winding shaft 26 so as to be kept at a predetermined height from the ground. The control unit is adapted to drive a motor for adjustment (in the example shown herein, an electric motor for adjustment housed inside the covering case 7) to rotate the winding shaft 26 so as to adjust the length of the adjusting belt wound around the winding shaft 26 to be withdrawn, thereby moving the cutting heads 30 up and down relative to the body chassis 5, and thus making the height of the cutting heads 30, that is, the height of the mowing blades 36 relative to the ground adjustable.

That is, the cutting heads 30, each having the mowing height adjusting mechanism with the aforementioned configuration, are movable upward relative to the body chassis 5. More specifically, while their downward movement is restricted (limited) with the adjusting belts, their relative upward movement is not restricted.

(Operation with Mowing Height Adjusting Mechanism)

In the lawn mower 1 including the cutting heads 30 with the aforementioned configuration, the cutting heads 30 are allowed to be movable upward relative to the body chassis 5 by the aforementioned mowing height adjusting mechanism. Further, as described above, the prong portions 41 of the bottom disk 40 provided in each cutting head 30 curve gradually upward toward their distal ends (or their outer ends). Therefore, when the lawn mower 1 approaches obstructions or objects left on the ground and the prong portions 41 of the bottom disk 40 contact them while the lawn mower 1 is automatically traveling (during the mowing operation), each cutting head 30 moves upward relative to the body chassis 5 (against the urging force of the urging spring) (specifically, each cutting head 30 oscillates upward relative to the body chassis 5 via the coupling members 28 having the coupling arms 27), so that the bottom disk 40 easily travels over the obstructions or objects left on the ground in such a manner as to move upward to avoid them. Further, the lawn mower 1 can be prevented from traveling off the ground, even if the bottom disk 40 travels over the obstructions or objects left on the ground.

As described above, in the lawn mower 1 of the present embodiment, when the prong portions 41 on the periphery of the bottom disk 40 are elastically deformed inward due to an external force applied thereto, the prong portions 41 abut the cutting disk 35 so as to transfer the received external force to the cutting disk 35 (in other words, the external force is partially received by the cutting disk 35). Further, the displacement of the prong portions 41 is restricted by the presence of the cutting disk 35. Thus, even when the bottom disk 40 is formed thin and light, the strength thereof can be easily secured. Therefore, the prong portions 41 of the bottom disk 40 are less likely to be deformed or damaged, even when they bump against hard obstructions within the mowing area. As a result, desired durability can be secured.

Further, since the prong portions 41 of the bottom disk 40 are made of an elastically deformable material (for example, resin), there is also another advantageous effect of easily flicking objects left on the ground (such as golf balls) with the elastic force of the prong portions 41 when the prong portions 41 contact such objects.

Furthermore, since the prong portions 41 of the bottom disk 40 curve upward toward their distal ends, the distal ends are less likely to contact left objects (such as golf balls) or obstructions (such as hard stones and rocks). With also such a configuration, the prong portions 41 of the bottom disk 40 are less likely to be deformed or damaged.

Moreover, the prong portions 41 of the bottom disk 40 are made of an elastically deformable material (for example, resin) and curve upward towards their distal ends. Thus, the bottom disk 40 easily travels over obstructions or objects left on the ground when the prong portions 41 contact them (in other words, the obstructions or objects left on the ground more easily enter below the bottom disk 40). With also this configuration, the prong portions 41 of the bottom disk 40 are less likely to be deformed or damaged.

With the aforementioned configurations, the mowing blades 36 provided on the cutting disk 35 can be surely prevented from damaging objects to be protected left on the ground (such as golf balls) and can also be surely protected. Therefore, the mowing operation can be efficiently performed without collecting objects to be protected, such as golf balls, left on the ground in advance even in the fields where such objects are scattered.

Although the embodiment described above illustrates an example of the battery-driven lawn mower that can automatically travel within the mowing area, it is obvious that the present disclosure may also be applicable to lawn mowers with an operator on board or manual lawn mowers controlled by manually pushing a handle.

Further, although the aforementioned embodiment illustrates an example in which the traveling and operating motors that are driven with power supplied from a built-in battery of the lawn mower are used as a drive source (or a power source) for the wheels and mowing blades, it is obvious that an engine or the like may also be used as a drive source for driving the wheels for automatic traveling and mowing blades for mowing operation.

What is claimed is:

1. A lawn mower comprising:
   a cutting disk secured to a rotating shaft and driven by the rotating shaft to rotate along with the rotating shaft;
   a bottom disk having a circumferential section formed with a plurality of fingers that extend radially outwardly toward a periphery of the cutting disk and terminate past the periphery of the cutting disk with spaces from the periphery of the cutting disk; and
   at least one mowing blade rotational within a space created between the cutting disk and the bottom disk, a respective at least one mowing blade being attached to a lower surface of the cutting disk away from the rotating shaft for rotation relative to the cutting disk around a rotational center such that the respective at least one mowing blade extending radially outwardly from the rotational center terminates short of the periphery of the cutting disk,
   wherein at least the fingers of the bottom disk are made of an elastically deformable material such that the fingers are deformable to come in contact with the periphery of the cutting disk to avoid the mowing blade from contacting the cutting disk, the bottom disk, and an object when the bottom disk rides on an object.

2. The lawn mower according to claim 1, wherein the respective at least one mowing blade is set so that circular motion of the respective mowing blade around the rotational center never reaches the periphery of the cutting disk.

3. The lawn mower according to claim 1, wherein the bottom disk is supported by the rotating shaft below the cutting disk for rotation around the rotating shaft relative to the cutting disk.

4. The lawn mower according to claim 1, wherein the plurality of fingers configured to extend radially outward and toward the periphery of the cutting disk and terminate above the periphery of the cutting disk with spaces from the periphery of the cutting disk.

5. The lawn mower according to claim 1, wherein the plurality of fingers are configured to extend radially outwardly with a curvature toward the periphery of the cutting disk.

6. The lawn mower according to claim 1, wherein the bottom disk is made of resin.

7. The lawn mower according to claim 1, wherein the cutting disk is supported for vertical movement relative to a body chassis of the lawn mower to ascend and descend relative to the body chassis of the lawn mower to adjust a height of mowing operation to be performed by the respective at least one mowing blade.

8. The lawn mower according to claim 1, wherein the lawn mower is automatically travelable.

* * * * *